US008121314B2

(12) United States Patent
Kageyama

(10) Patent No.: US 8,121,314 B2
(45) Date of Patent: Feb. 21, 2012

(54) MIXING APPARATUS, MIXING METHOD, AND MIXING PROGRAM

(75) Inventor: Takahisa Kageyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1969 days.

(21) Appl. No.: 11/086,868

(22) Filed: Mar. 21, 2005

(65) Prior Publication Data

US 2005/0207597 A1 Sep. 22, 2005

(30) Foreign Application Priority Data

Mar. 22, 2004 (JP) ................................ 2004-082292

(51) Int. Cl.
*H04B 1/00* (2006.01)
*H02B 1/00* (2006.01)
*G10H 1/08* (2006.01)
*G06F 17/00* (2006.01)

(52) U.S. Cl. ............ 381/119; 381/123; 84/625; 84/660; 700/94

(58) Field of Classification Search .................. 381/119, 381/123, 104–109; 700/94; 84/625, 660
See application file for complete search history.

(56) References Cited

U.S. PATENT DOCUMENTS

| | | | |
|---|---|---|---|
| 5,159,141 A | 10/1992 | Iba | |
| 5,471,539 A * | 11/1995 | Flum et al. | 381/119 |
| 5,488,669 A | 1/1996 | Zampini et al. | |
| 2002/0065570 A1* | 5/2002 | Fujita et al. | 700/94 |
| 2003/0076966 A1* | 4/2003 | Okabayashi | 381/119 |
| 2005/0255817 A1* | 11/2005 | Edeler | 455/161.1 |

FOREIGN PATENT DOCUMENTS

| | | |
|---|---|---|
| JP | 04-005693 A | 1/1992 |
| JP | 04-030384 A | 2/1992 |
| JP | 04-343600 A | 11/1992 |
| JP | 05-323983 A | 12/1993 |
| JP | 08-031089 A | 2/1996 |

OTHER PUBLICATIONS

Applicant's admitted prior art, p. 1, line 20-p. 3, line 1. No date available.*
Digital Production Console DM2000 (2002). Owner's Manual, pp. 48, 49, 132, 133, 138 and 343 (DM2000 Block Diagram), with English translation, 12 pages.
Office Action mailed Jun. 4, 2009, for JP Application No. 2004-082292, with English translation, five pages.
Office Action mailed Aug. 24, 2009, for JP Application No. 2004-082292, with English translation, five pages.
Interrogation mailed Oct. 29, 2010, for JP Appeal No. 2009-22984 for JP Application No. 2004-82292, with English Translation, eight pages.
European Search Report mailed Mar. 7, 2011, for EP Application No. 05102232.5, three pages.

* cited by examiner

*Primary Examiner* — Devona Faulk
(74) *Attorney, Agent, or Firm* — Morrison & Foerster LLP

(57) ABSTRACT

A mixing apparatus which makes it possible to monitor an internally-generated audio signal and an audio signal from an external apparatus not only in response to turning-on/off of a monitor switch but also in flexible and various manners when mixing those signals. The mixing apparatus is connected to at least one external apparatus, for inputting and mixing a plurality of audio signals and outputting a resulting mixed audio signal. The input audio signals are mixed into a mixed audio signal. The mixed audio signal and an audio signal input from the external apparatus are mixed using a predetermined monitor mix balance into a monitor output signal. A monitor switch is operated to switch between a plurality of monitor states. The predetermined monitor mix balance is changed according to a monitor state after switching by the monitor switch.

9 Claims, 5 Drawing Sheets

MIXING APPARATUS, MIXING METHOD, AND MIXING PROGRAM

BACKGROUND OF THE INVENTION

1. Field of the Invention

The present invention relates to a mixing apparatus and a mixing method which can input and mix a plurality of audio signals and output the resulting mixed signal, as well as a program for implementing the mixing method. In particular, the present invention relates to a mixing apparatus and a mixing method which make it possible to set a plurality of monitor mix balances in mixing an internally generated audio signal and an audio signal from an external apparatus, as well as a program for implementing the mixing method.

2. Description of the Related Art

Conventionally, there has been known a mixing apparatus which inputs various audio signals (for example, audio signals collected by e.g. a microphone, audio signals output from various musical instruments, audio signals output from various MIDI tone generators, and audio signals output from a sequencer), mixes at least two audio signals thus input, and applies effects to an audio signal obtained by mixing and outputs the resulting mixed audio signal. In general, this mixing apparatus is provided with a plurality of monitor output terminals and a plurality of monitor switches. By turning on one of the monitor switches, it is possible to monitor a final stereo output via a speaker or a headphone connected to the monitor output terminal associated with the turned-on monitor switch, and therefore possible to check e.g. whether the condition of mixing is appropriate or not.

On the other hand, in recent years, there has been known a so-called digital audio workstation (DAW) and an audio sequencer which realize various functions required for music production (for example, a hard disk recording function, a mixing function, and a MIDI equipment controlling function) by operating predetermined programs on a personal computer (PC). Also, there has been known a system in which the mixing apparatus and the DAW and/or the sequencer are connected to each other so that the mixing apparatus and the DAW and/or the sequencer can operate in cooperation with each other. The plurality of apparatuses are connected to each other via a network conforming to standards such as IEEE1394 so that a large quantity of data can be transferred at a high speed. An audio signal created by the DAW and/or the sequencer on the PC is input to the mixing apparatus, and further, at least two audio signals are input via a plurality of different input channels (for example, input channels of a microphone, a guitar, a synthesizer/tone generator, or other equipment) of the mixing apparatus, and the input two audio signals are mixed within the mixing apparatus, and effects are applied to the mixed audio signal, and the audio signal with the effects applied thereto and the audio signal from the DAW and/or the sequencer are mixed into a final output.

By the way, as mentioned above, the monitoring function of the mixing apparatus only enables monitoring of a final stereo output when a monitor switch is turned on. Therefore, it is impossible to check only an audio signal generated by applying effects thereto within the mixing apparatus, or to check only an audio signal input from e.g. an external DAW. In the case where audio signals are input to the mixing apparatus via multiple channels, it is desirable that the monitoring function enables monitoring of the input audio signals in flexible and various manners.

SUMMARY OF THE INVENTION

It is an object of the present invention to provide a mixing apparatus and a mixing method which make it possible to monitor an internally-generated audio signal and an audio signal from an external apparatus not only in response to turning-on/off of a monitor switch but also in flexible and various manners when mixing those signals, as well as a program for implementing the mixing method.

To attain the above object, there is provided a mixing apparatus connected to at least one external apparatus, for inputting and mixing a plurality of audio signals and outputting a resulting mixed audio signal, comprising an internal mixing device that mixes the input plurality of audio signals and generates a mixed audio signal, an input device that inputs an audio signal generated by the external apparatus, a monitor output signal generating device that mixes the mixed audio signal generated by the internal mixing device and the audio signal input from the external apparatus by using a predetermined monitor mix balance to generate a monitor output signal, a monitor operating element that switches between a plurality of monitor states, and a changing device that changes the predetermined monitor mix balance according to a monitor state after switching by the monitor operating element.

According to this arrangement, there are provided a plurality of monitor mix balances to be applied in mixing an audio signal internally generated in the mixing apparatus and an audio signal input from an external apparatus and outputting the resulting signal. As a result, output signals can be monitored in flexible and various manners; for example, it is possible to monitor only an internally-generated stereo signal, monitor only a stereo signal from an external apparatus, and monitor a signal obtained by mixing those signals in a predetermined balance.

Preferably, the mixing apparatus further comprises a first setting device that sets monitor mix balances in respective ones of the monitor states.

Preferably, the mixing apparatus further comprises a second setting device responsive to operation of a predetermined switch in setting the monitor mix balance, to set a default value of a monitor mix balance or a value of an even valance.

To attain the above object, in a second aspect of the present invention, there is provided a mixing apparatus connected to at least one external apparatus, for inputting and mixing a plurality of audio signals and outputting a resulting mixed audio signal, comprising an internal mixing device that mixes the input plurality of audio signals and generates a mixed audio signal, an input device that inputs an audio signal generated by the external apparatus, a monitor output signal generating device that mixes the mixed audio signal generated by the internal mixing device and the audio signal input from the external apparatus by using a predetermined monitor mix balance to generate a monitor output signal, a monitor operating element that alternately switches between a first monitor state and a second monitor state each time the monitor operating element is depressed, and a setting device that sets a first balance value as the monitor mix balance in the first monitor state, and sets a second balance value as the monitor mix balance in the second monitor state.

According to this arrangement, the same effects can be provided as in the first aspect of the present invention.

Preferably, the setting device comprises a balance value setting device operable when the monitor operating element is continuously depressed, to display a screen for setting the first balance value and the second balance value, and set the first balance value and the second balance value on the screen.

Preferably, the mixing apparatus further comprises a monitor mix balance value setting device responsive to operation of a predetermined switch in setting the monitor mix balance, to set a default value of a monitor mix balance or an even balance value in response to operation of a predetermined switch.

To attain the above object, in a third aspect of the present invention, there is provided a mixing apparatus connected to at least one external apparatus and at least one external recording apparatus, for inputting and mixing a plurality of audio signals and outputting a resulting mixed audio signal, comprising a recording audio signal generating and outputting device that generates an audio signal for recording from the input plurality of audio signals and outputs the generated audio signal to the external recording apparatus, a monitor audio signal generating device that internally generates an audio signal for monitoring from the input plurality of audio signals, an input device that inputs an audio signal generated by the external apparatus, a monitor output signal generating device that mixes the internally generated monitor audio signal and the audio signal input from the external apparatus by using a predetermined monitor mix balance to generate a monitor output signal, a monitor operating element that switches between a plurality of monitor states, and a changing device that changes the predetermined monitor mix balance according to a monitor state after switching by the monitor operating element.

According to this arrangement, the same effects can be provided as in the first aspect of the present invention.

To attain the above object, in a fourth aspect of the present invention, there is provided a mixing method applied to a mixing apparatus connected to at least one external apparatus, for inputting and mixing a plurality of audio signals and outputting a resulting mixed audio signal, comprising an internally mixing step of mixing the input plurality of audio signals and generating a mixed audio signal, an input step of inputting an audio signal generated by the external apparatus, a monitor output signal generating step of mixing the mixed audio signal generated in the internally mixing step and the audio signal input from the external apparatus by using a predetermined monitor mix balance to generate a monitor output signal, a monitor state switching step of switching between a plurality of monitor states, and a changing step of changing the predetermined monitor mix balance according to a monitor state after switching in the monitor state switching step.

To attain the above object, in a fifth aspect of the present invention, there is provided a mixing method applied to a mixing apparatus connected to at least one external apparatus, for inputting and mixing a plurality of audio signals and outputting a resulting mixed audio signal, comprising an internally mixing step of mixing the input plurality of audio signals and generating a mixed audio signal, an input step of inputting an audio signal generated by the external apparatus, a monitor output signal generating step of mixing the mixed audio signal generated in the internally mixing step and the audio signal input from the external apparatus by using a predetermined monitor mix balance to generate a monitor output signal, a monitor state switching step of alternately switching between a first monitor state and a second monitor state, and a setting step of setting a first balance value as the monitor mix balance in the first monitor state, and setting a second balance value as the monitor mix balance in the second monitor state.

To attain the above object, in a sixth aspect of the present invention, there is provided a mixing method applied to a mixing apparatus connected to at least one external apparatus and at least one external recording apparatus, for inputting and mixing a plurality of audio signals and outputting a resulting mixed audio signal, comprising a recording audio signal generating and outputting step of generating an audio signal for recording from the input plurality of audio signals and outputting the generated audio signal to the external recording apparatus, a monitor audio signal generating step of internally generating an audio signal for monitoring from the input plurality of audio signals, an input step of inputting an audio signal generated by the external apparatus, a monitor output signal generating step of mixing the internally generated monitor audio signal and the audio signal input from the external apparatus by using a predetermined monitor mix balance to generate a monitor output signal, a monitor state switching step of switching between a plurality of monitor states, and a changing step of changing the predetermined monitor mix balance according to a monitor state after switching in the monitor state switching step.

To attain the above object, in a seventh aspect of the present invention, there is provided a mixing program executed by a computer connected to at least one external apparatus, for inputting and mixing a plurality of audio signals and outputting a resulting mixed audio signal, comprising an internally mixing module for mixing the input plurality of audio signals and generating a mixed audio signal, an input module for inputting an audio signal generated by the external apparatus, a monitor output signal generating module for mixing the mixed audio signal generated by the internally mixing module and the audio signal input from the external apparatus by using a predetermined monitor mix balance to generate a monitor output signal, a monitor state switching module for switching between a plurality of monitor states, and a changing module for changing the predetermined monitor mix balance according to a monitor state after switching by the monitor state switching module.

To attain the above object, in an eighth aspect of the present invention, there is provided a mixing program executed by a computer connected to at least one external apparatus, for inputting and mixing a plurality of audio signals and outputting a resulting mixed audio signal, comprising an internally mixing module for mixing the input plurality of audio signals and generating a mixed audio signal, an input module for inputting an audio signal generated by the external apparatus, a monitor output signal generating module for mixing the mixed audio signal generated in the internally mixing module and the audio signal input from the external apparatus by using a predetermined monitor mix balance to generate a monitor output signal, a monitor state switching module for alternately switching between a first monitor state and a second monitor state, and a setting module for setting a first balance value as the monitor mix balance in the first monitor state, and setting a second balance value as the monitor mix balance in the second monitor state.

To attain the above object, in a ninth aspect of the present invention, there is provided a mixing program executed by a computer connected to at least one external apparatus and at least one external recording apparatus, for inputting and mixing a plurality of audio signals and outputting a resulting mixed audio signal, comprising a recording audio signal generating and outputting module for generating an audio signal for recording from the input plurality of audio signals and outputting the generated audio signal to the external recording apparatus, a monitor audio signal generating module for internally generating an audio signal for monitoring from the input plurality of audio signals, an input module for inputting an audio signal generated by the external apparatus, a monitor output signal generating module for mixing the internally generated monitor audio signal and the audio signal input from the external apparatus by using a predetermined monitor mix balance to generate a monitor output signal, a monitor state switching module for switching between a plurality of monitor states, and a changing module for changing the predetermined monitor mix balance according to a monitor state after switching by the monitor state switching module.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
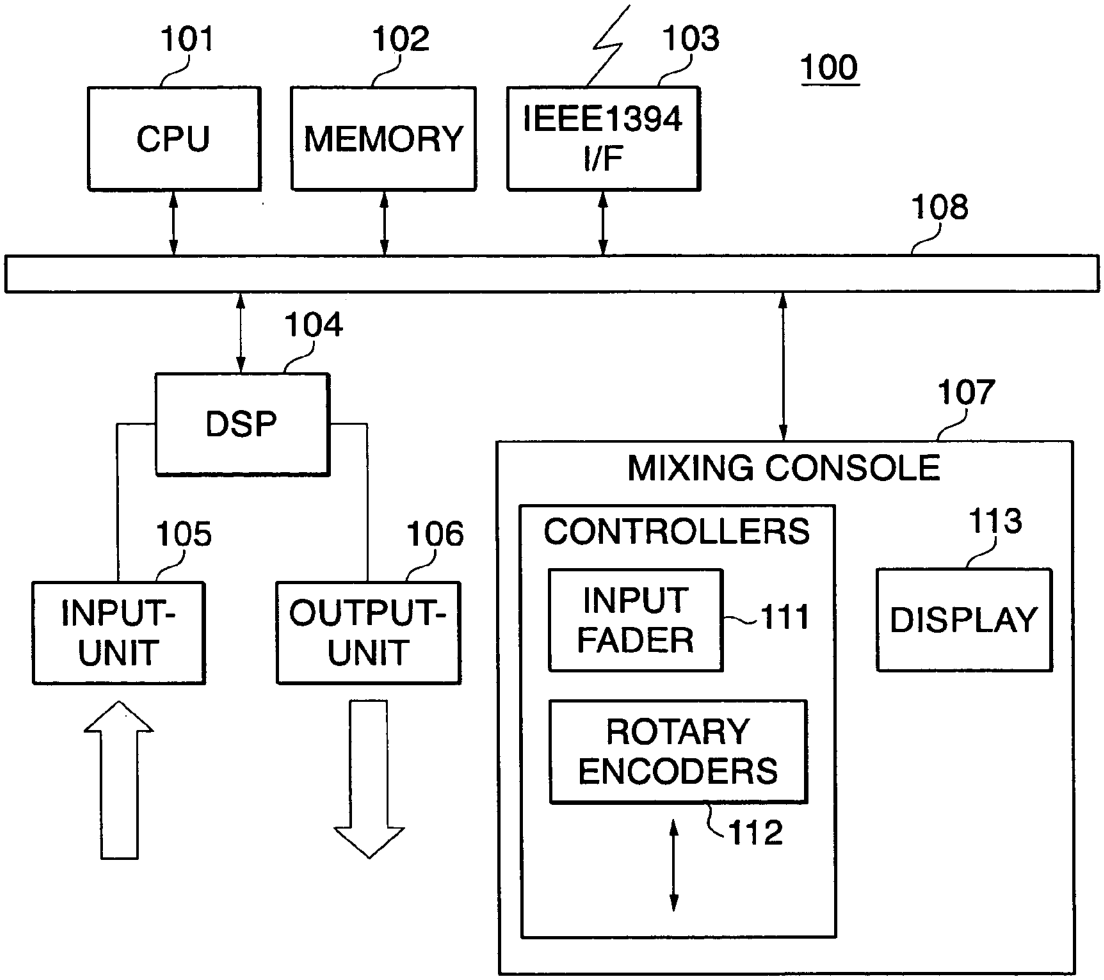
FIG. 1 is a block diagram showing the construction of a mixing apparatus (digital mixer) according to an embodiment of the present invention.

The present invention will now be described in detail with reference to the drawings showing a preferred embodiment thereof. In the drawings, elements and parts which are identical throughout the views are designated by identical reference numerals, and duplicate description thereof is omitted.

FIG. 1 is a block diagram showing the construction of a mixing apparatus (digital mixer) according to an embodiment of the present invention. The digital mixer 100 is comprised of a central processing unit (CPU) 101, a memory 102, a communication interface (IEEE1394 I/F) 103, a digital signal processor (DSP) 104, an input unit 105, an output unit 106, and a mixing console 107. Reference numeral 108 denotes a bus line that connects the component parts to each other.

The CPU 101 is a controller that controls the overall operation of the digital mixer 100. The memory 102 is comprised of a ROM that stores programs to be executed by the CPU 101, and a RAM that is used as a working memory. The communication I/F 103 provides interface for connection to various external apparatuses (for example, a PC functioning as a DAW and/or a sequencer, an electronic musical instrument or an electronic apparatus such as a digital mixer, or various audio equipment). The communication I/F 103 provides interface for transferring a large quantity of data (such as audio data and MIDI data) according to IEEE1394 Standards. The DSP 104 carries out a mixing process and an effect-applying process on a signal input via the input unit 105 in accordance with an instruction from the CPU 101, and outputs the resulting signal via the output unit 106. The input unit 105 inputs a plurality of microphone signals, line signals, and so forth. The output unit 106 carries out digital-to-analog conversion of a signal output from the DSP 104 and outputs the resulting signal to e.g. a speaker. The mixing console 107 is operated by the user, and a plurality of controllers (such as an input fader 111 and rotary encoders 112) and a display 113 are provided on an external panel of the mixing console 107.

Figure 2:
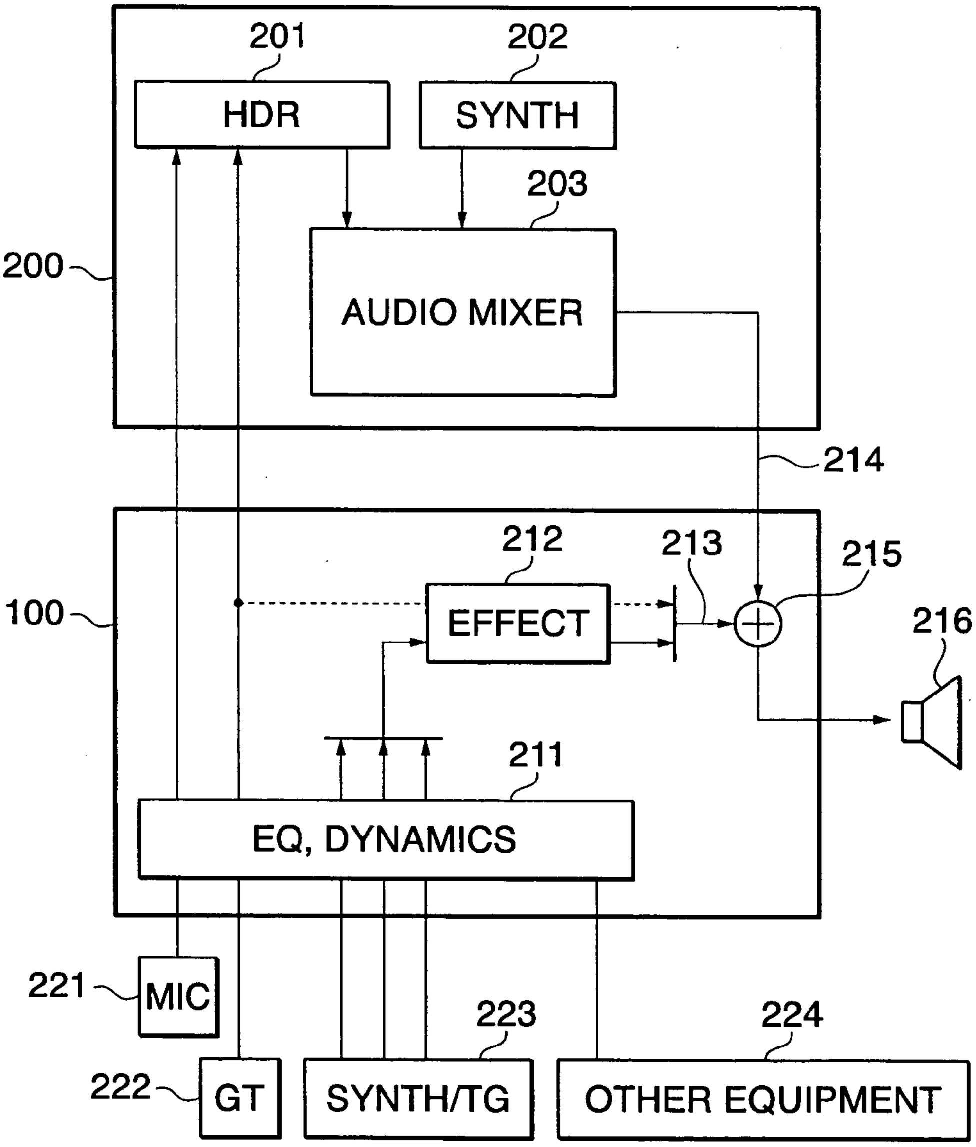
FIG. 2 is a diagram showing the flow of signals in the case where recording is carried out in a state in which the digital mixer and a digital audio workstation (DAW) are connected to each other.

FIG. 2 shows the flow of signals in the case where hard disk recording is carried out in a state in which a DAW 200 is connected to the digital mixer 100 in FIG. 1. An audio signal is input from a microphone 221, a guitar 222, a synthesizer (Synth)/tone generator (TG) 223, or other equipment 224 to the digital mixer 100. This corresponds to the input of an audio signal via the input unit 105 and the communication interface 103 appearing in FIG. 1. In the digital mixer 100, a process 211 in which equalizer processing (EQ) or dynamics processing is performed on the input audio signals as the need arises is carried out to control the tone quality and the volume. The audio signals with the tone quality and the volume thereof controlled are transferred to e.g. the DAW 200 via the communication I/F 103, and the DAW 200 records them in respective tracks (a hard disk recording process 201). Alternatively, the audio signals are assigned to a recording bus within the digital mixer 100, and collected into two channels (L/R), i.e. right and left channels and output to the DAW 200 via the communication I/F 103, and recorded as a stereo track by the DAW 200 (the hard disk recording process 201).

The DAW 200 which carries out recording is realized by executing a predetermined program on a PC. Also, the DAW 200 is capable of generating e.g. accompaniment tones using a synthesizer 202, and outputting the accompaniment tones via an audio mixer 203. During recording, the digital mixer 100 carries out an effect process 212 to apply effects such as balances and reverberations to audio signals different from tones which are to be recorded so that a player can easily perform a piece of music.

The digital mixer 100 then mixes an output 213 thus internally generated and an audio signal 214 output from the DAW 200 (215), and then outputs the resulting audio signal to a monitor speaker 216 (or a headphone or the like). As a result, it is possible to record input performance tones from the microphone 221, the guitar 222, or the like while monitoring accompaniment tones generated by the synthesizer 202 of the DAW 200.

It should be noted that the process 211 such as EQ (equalizer) processing, effect process 212, mixing process 215, and so forth are carried out in the digital mixer 100 by the DSP 104 in FIG. 1 according to an instruction from the CPU 101.

Further, although FIG. 2 shows an example of hard disk recording, the digital mixer 100 may perform a mixing-down process in which a recorded audio signal and a separately input audio signal are controlled as a whole while being monitored, and a final stereo output is recorded. Further, the digital mixer 100 may be used alone without being connected to the DAW 200.

Figure 3:
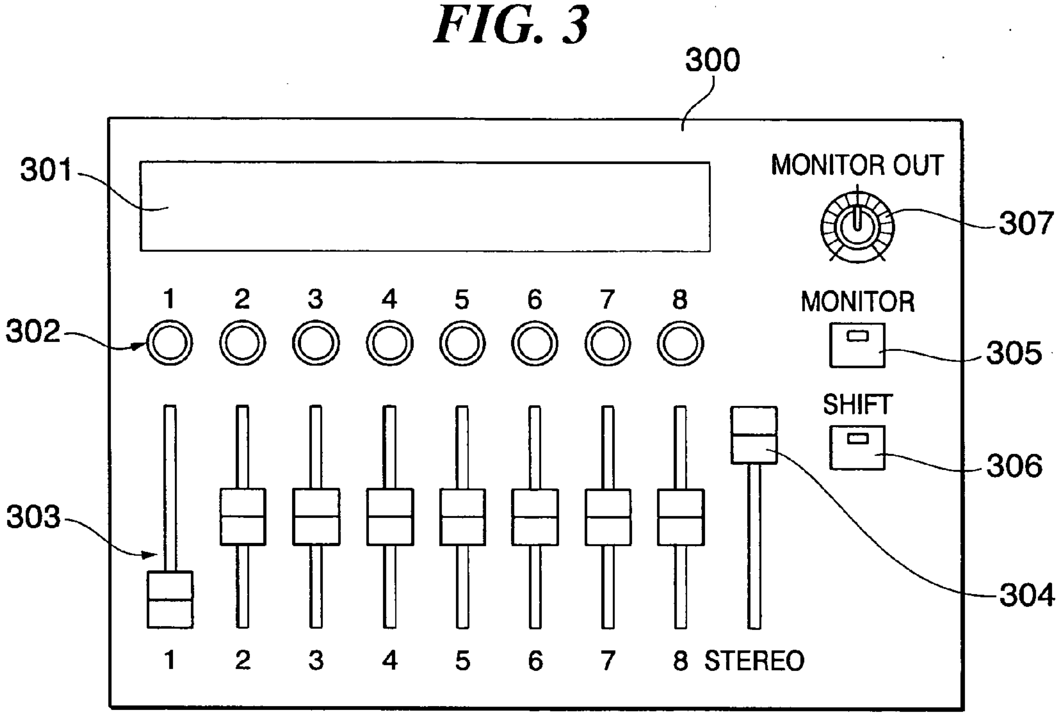
FIG. 3 is a view showing the appearance of a panel of the digital mixer.

FIG. 3 shows the appearance of a panel 300 of the digital mixer 100. Reference numeral 301 denotes a display (113 in FIG. 1), and reference numeral 302 denotes eight rotary encoders. Numerals 1 to 8 given above the respective rotary encoders 302 indicate the respective positions of them. The rotary encoders 302 will hereinafter be referred to as RE1 to RE8, respectively. Each RE is provided with a plurality of LEDs as indicators that indicate the level of a parameter controlled by the RE and are arranged around a knob rotated by the user. Each RE also serves as a push switch that is turned on by depressing the knob. Reference numeral 303 denotes eight input faders which are used for adjusting e.g. the volume level for each channel. Reference numreal 304 denotes a fader which controls the volume level of a stereo output obtained as a result of mixing. Reference numeral 305 denotes a monitor switch; 306, a shift switch; and 307, a volume for controlling the monitor output level. The monitor switch 305 and the shift switch 306 are each provided with an LED which indicates an on/off state.

It should be noted that operating elements (for example, an operating element for directly controlling the DAW connected to the digital mixer 100) other than the operating elements appearing in FIG. 3 are actually provided on the panel 300 of the digital mixer 100, but description thereof is omitted.

With the digital mixer 100, a speaker or a headphone for monitoring (216 in FIG. 2) can be connected to a monitor-out/headphone-out output terminal, not shown, so that output signals can be monitored. In particular, depending on whether the monitor switch 305 is on (the LED is on) or off (the LED is off), there can be two kinds of balances applied when mixing a stereo signal generated inside the digital mixer 100 and a stereo signal from the DAW 200 and outputting the resulting signal. The LED of the monitor switch 305 is alternately turned on or off each time the monitor switch 305 is depressed. It should be noted that in the present embodiment, the expression "the monitor switch 305 is on" does not mean "there is no monitor output". Irrespective of whether the monitor switch 305 is on (the LED is on) or off (the LED is off), there is a monitor output. According to whether the monitor switch 305 is on or off, the balance in mixing a stereo signal generated inside the digital mixer 100 and a stereo signal from the DAW 200 and outputting the resulting signal is changed.

Figure 4:
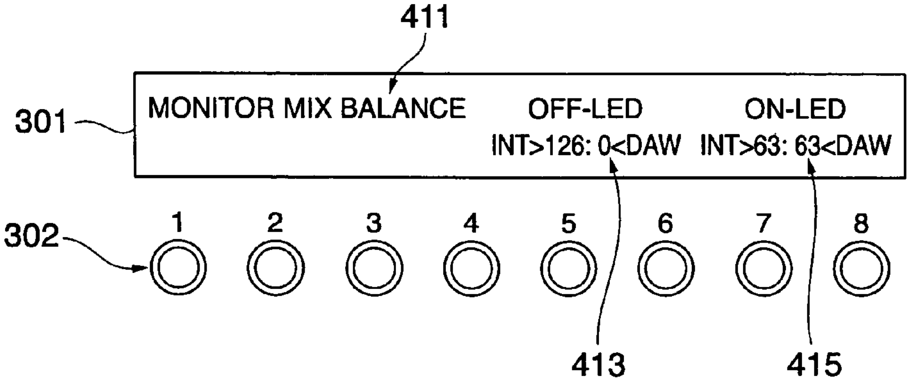
FIG. 4 is a view showing an example of a screen view on the panel of the digital mixer when monitor mix balances are set.

Further, by continuously depressing the monitor switch 305, a screen as shown in FIG. 4 is displayed so that the balance in the case where the LED of the monitor switch 305 is on and the balance in the case where the LED of the monitor switch 305 is off can be set. In FIG. 4, reference numeral 411 denotes a message displayed to indicate that the present screen is a monitor mix balance setting screen. Reference numeral 413 denotes the present set value of the monitor mix balance in the case where the LED of the monitor switch 305 is off (off). "INT>126" indicates that the value of the monitor level of a stereo signal (213 in FIG. 2) generated inside the digital mixer 100 is 126, and "0<DAW" indicates that the value of the monitor level of a stereo signal (214 in FIG. 2) from the DAW 200 is 0. Similarly, reference numeral 415 indicates the present set value of the monitor mix balance in the case where the LED of the monitor switch 305 is on (on). "INT>63" indicates that the value of the monitor level of a stereo signal generated inside the digital mixer 100 is 63, and "63<DAW" indicates that the value of the monitor level of a stereo signal from the DAW 200 is 63.

By rotating the RE 5 below the display 413 in the state shown in FIG. 4, it is possible to change the monitor mix balance indicated by the display 413. Similarly, by rotating the RE 7, it is possible to change the monitor mix balance indicated by the display 415. Further, by depressing the knobs of the RE5 and RE7, it is possible to set the monitor mix balances thereof to an even balance. The even balance is represented by "INT>63:63<DAW". Further, by depressing the RE5 while depressing the shift switch 306, a predetermined default value is set as the monitor mix balance. This also applies to the RE7.

Figure 5:
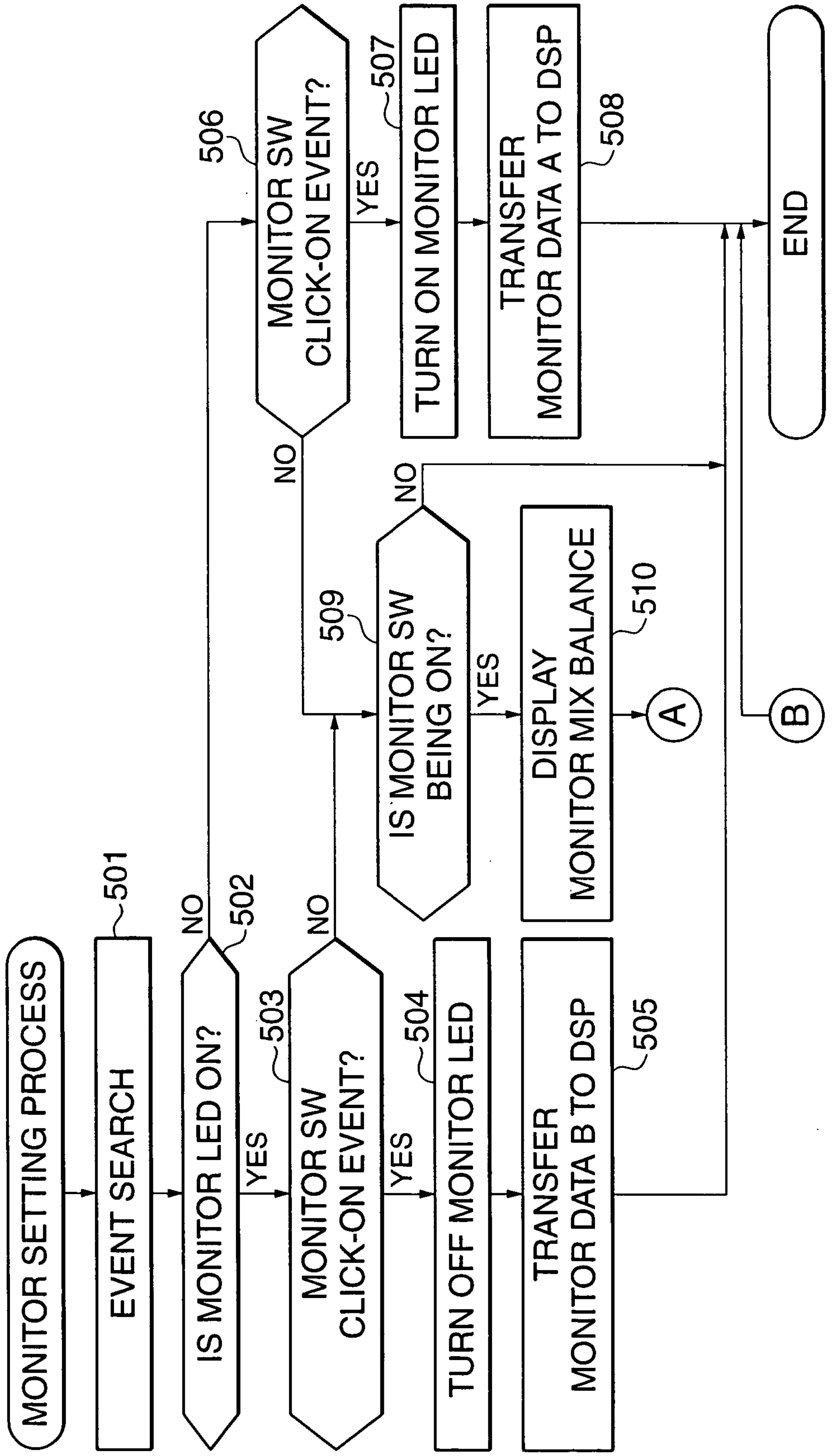
FIG. 5 is a flow chart showing a monitor mix balance setting process.
Figure 6:
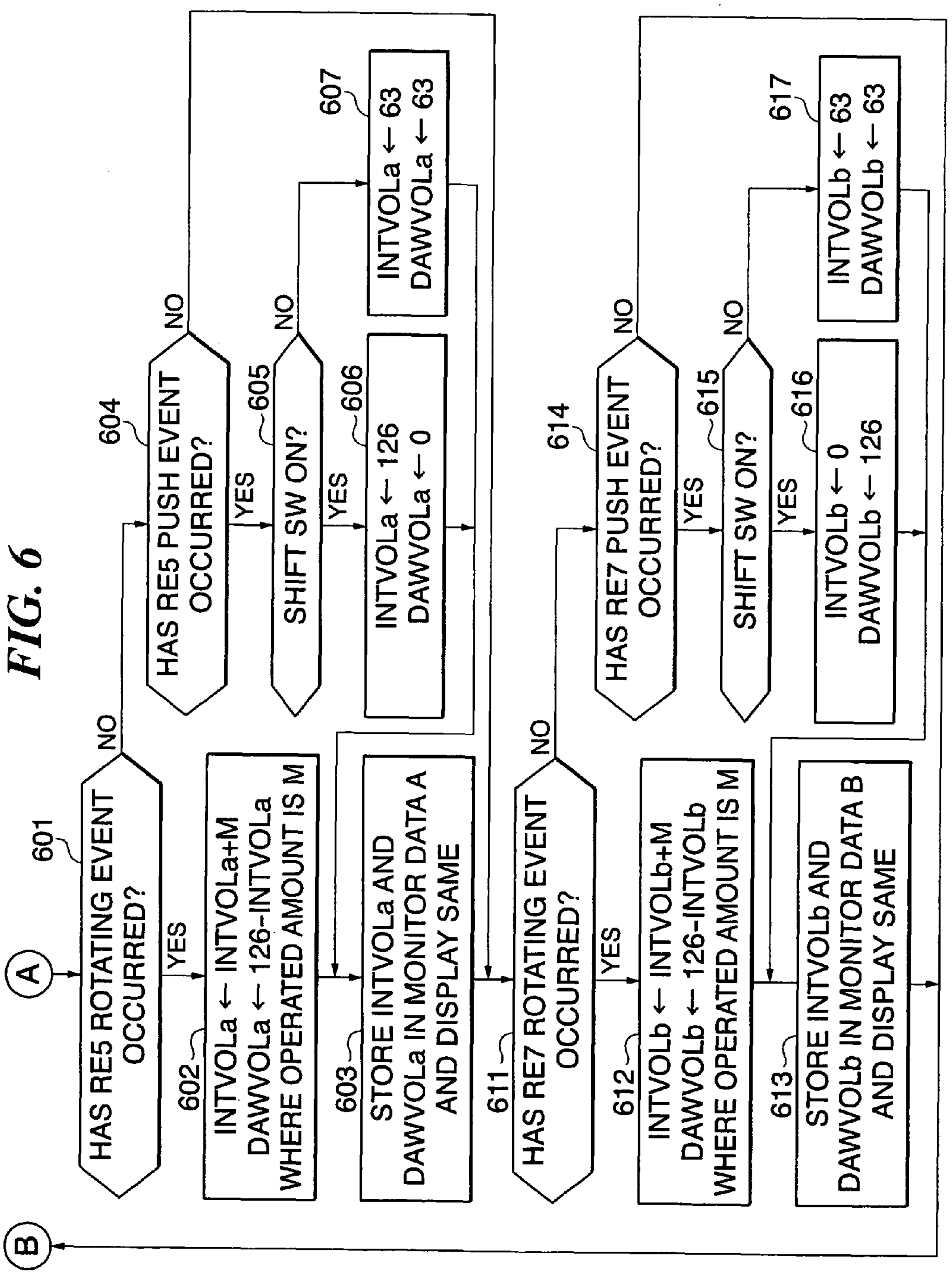
FIG. 6 is a flow chart showing a continued part of the monitor mix balance setting process in FIG. 5.

FIGS. 5 and 6 show a monitor mix balance setting process. This process is activated by the CPU 101 when the monitor switch 305 is operated. First, in a step S501, an event search is carried out with respect to an operation performed by the user. In a step S502, it is determined whether or not the LED of the monitor switch 305 is on. If the LED of the monitor switch 305 is on, it is then determined whether or not the operation performed by the user is a click-on event of the monitor switch 305 (an operation in which the monitor switch 305 is released immediately after it is depressed). If the operation performed by the user is the click-on event, the LED of the monitor switch 305 is turned off in a step S504. Then, in a step S505, monitor data B is transferred to the DSP 104. The monitor data B is the value of the monitor mix balance (the set value indicated by the display 413 in FIG. 4) in the state in which the LED of the monitor switch 305 is off. The value of the monitor mix balance of the monitor data B is transferred to the DSP 104 so that the monitor mix balance is set to the transferred value, i.e. set value. After execution of the step S505, the process is terminated.

If it is determined in the step S502 that the LED of the monitor switch 305 is off, it is then determined in a step S506 whether or not the operation performed by the user is the click-on event. If the operation performed by the user is the click-on event, the LED of the monitor switch 305 is turned on in a step S507. Then, in a step S508, monitor data A is transferred to the DSP 104. The monitor data A is the value of the monitor mix balance (the set value indicated by the display 415 in FIG. 4) in the state in which the LED of the monitor switch 305 is on. The value of the monitor mix balance of the monitor data A is transferred to the DSP 104 so that the monitor mix balance is set to the transferred value, i.e. set value. After execution of the step S508, the process is terminated.

If it is determined in the step S503 or S506 that the operation performed by the user is not the click-on event, it is then determined in a step S509 whether or not the monitor switch 305 is being depressed. If the monitor switch 305 is not being depressed, the process is immediately terminated. If the monitor switch 305 is being depressed, the monitor mix balance setting screen shown in FIG. 4 is displayed in a step S510. The display 413 indicates the set value of the monitor data B, and the display 415 indicates the set value of the monitor data A.

After execution of the step S510, it is determined in a step S601 whether or not a RE5 rotating event has occurred. If the RE5 rotating event has occurred, the following operations are performed: INTVOLa←INTVOLa+M and DAWVOLa←126-INTVOLa, where M indicates the operated amount of the RE5. "INTVOLa" indicates a work register that stores the value of the monitor level of the stereo signal 213 generated inside the digital mixer 100 when the LED of the monitor switch 305 is off, and "DAWVOLa" indicates a work register that stores the value of the monitor level of the stereo signal 214 from the DAW. After execution of the step S602, the values of INTVOLa and DAWVOLa are set to the monitor data A and stored, and the stored set values (INTVOLa and DAWVOLa) of the monitor mix balance are indicated by the display 413 in FIG. 4 in a step S603.

If it is determined in the step S601 that the RE5 rotating event has not occurred, it is then determined in a step S604 whether or not a push event has occurred in which the knob of the RE5 is pushed. If the push event has occurred, it is determined in a step S605 whether the shift switch 306 is on or off. If the shift switch 306 is on, the default value of the monitor mix balance in the case where the LED of the monitor switch 305 is off is set in INTVOLA and DAWVOLa, and the process proceeds to the step S603. If the shift switch 306 is off, the even valance i.e. 63 is set in INTVOLa and DAWVOLa in a step S607, and the process proceeds to the step S603.

Steps S611 to S617 correspond in processing to the steps S601 to S607, respectively (blocks whose step numbers have the same ones digits correspond to each other). In the steps S611 to S617, however, the mix balance in the case where the LED of the monitor switch 305 is on is set, and hence the RE7 is used in place of the RE5, INTVOLb is used in place of INTVOLa, DAWVOLb is used in place of DAWVOLa, and the monitor data B is used in place of the monitor data A. Also, the default value set in the step S616 is opposite in balance state to the default value set in the step S606.

As described hereinabove, according to the present embodiment, there are provided plural kinds of monitor mix balances to be applied in mixing an audio signal generated inside the digital mixer and an audio signal input from an external apparatus and outputting the resulting signal. As a result, output signals can be monitored in flexible and various manners; for example, it is possible to monitor only a stereo signal generated inside the digital mixer, monitor only a stereo signal from an external apparatus, or monitor a signal obtained by mixing those stereo signals in a predetermined balance.

It should be noted that in the above described embodiment, although the DAW is given as an example of an external apparatus connected to the digital mixer, other external apparatuses may be used.

Further, although two kinds of monitor mix balances are provided depending on whether the monitor switch 305 is on or off, other monitor mix balances may be additionally used. The default values set in the steps S606 and S616 are not limitative, but may be any values.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium in which the program code is stored constitute the present invention.

Examples of the storage medium for supplying the program code include a floppy (registered trademark) disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be supplied by downloading via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A mixing apparatus connected to at least one external apparatus, for inputting and mixing a plurality of audio signals and outputting a resulting mixed audio signal, comprising:

an internal mixing device that mixes the input plurality of audio signals and generates a mixed audio signal;

an input device that inputs an audio signal generated by the external apparatus; a monitor output signal generating device that mixes the mixed audio signal generated by said internal mixing device and the audio signal input from the external apparatus by using a predetermined monitor mix balance to generate a monitor output signal;

a monitor operating element that switches between a plurality of monitor states;

a changing device that changes the predetermined monitor mix balance according to a monitor state after switching by said monitor operating element;

a first setting device that sets monitor mix balances in respective ones of the monitor states;

and a second setting device configured to switch between a default value of a monitor mix balance and a value of an even balance.

2. A mixing apparatus connected to at least one external apparatus, for inputting and mixing a plurality of audio signals and outputting a resulting mixed audio signal, comprising:

an internal mixing device that mixes the input plurality of audio signals and generates a mixed audio signal;

an input device that inputs an audio signal generated by the external apparatus;

a monitor output signal generating device that mixes the mixed audio signal generated by said internal mixing device and the audio signal input from the external apparatus by using a predetermined monitor mix balance to generate a monitor output signal;

a monitor operating element that alternately switches between a first monitor state and a second monitor state each time said monitor operating element is depressed; and a setting device that sets a first balance value as the monitor mix balance in the first monitor state, and sets a second balance value as the monitor mix balance in the second monitor state, wherein said setting device comprises a balance value setting device operable when said monitor operating element is continuously depressed, to display a screen for setting the first balance value and the second balance value, and set the first balance value and the second balance value on the screen.

3. A mixing apparatus according to claim 2, further comprising a monitor mix balance value setting device that sets a default value of a monitor mix balance or an even balance value in response to operation of a predetermined switch.

4. A mixing method applied to a mixing apparatus connected to at least one external apparatus, for inputting and mixing a plurality of audio signals and outputting a resulting mixed audio signal, comprising:

an internally mixing step of mixing the input plurality of audio signals and generating a mixed audio signal;

an input step of inputting an audio signal generated by the external apparatus; a monitor output signal generating step of mixing the mixed audio signal generated in said internally mixing step and the audio signal input from the external apparatus by using a predetermined monitor mix balance to generate a monitor output signal;

a monitor state switching step of switching between a plurality of monitor states;

a changing step of changing the predetermined monitor mix balance according to a monitor state after switching in said monitor state switching step;

a first setting step of setting monitor mix balances in respective ones of the monitor states;

and a second setting step of switching between a default value of a monitor mix balance and a value of an even balance.

5. A mixing method applied to a mixing apparatus connected to at least one external apparatus, for inputting and mixing a plurality of audio signals and outputting a resulting mixed audio signal, comprising:

an internally mixing step of mixing the input plurality of audio signals and generating a mixed audio signal;

an input step of inputting an audio signal generated by the external apparatus;

a monitor output signal generating step of mixing the mixed audio signal generated in said internally mixing step and the audio signal input from the external apparatus by using a predetermined monitor mix balance to generate a monitor output signal;

a monitor state switching step of alternately switching between a first monitor state and a second monitor state; and a setting step of setting a first balance value as the monitor mix balance in the first monitor state, and setting a second balance value as the monitor mix balance in the second monitor state, wherein the setting step further comprises, when the monitor state is a continuously-depressed state, displaying a screen for setting the first balance value and the second balance value, and setting the first balance value and the second balance value on the screen.

6. A non-transitory computer readable storage medium including a program this is mixing program executed by a computer connected to at least one external apparatus, for inputting and mixing a plurality of audio signals and outputting a resulting mixed audio signal, comprising:

an internally mixing module for mixing the input plurality of audio signals and generating a mixed audio signal;

an input module for inputting an audio signal generated by the external apparatus; a monitor output signal generating module for mixing the mixed audio signal generated by said internally mixing module and the audio signal input from the external apparatus by using a predetermined monitor mix balance to generate a monitor output signal;

a monitor state switching module for switching between a plurality of monitor states;

a changing module for changing the predetermined monitor mix balance according to a monitor state after switching by said monitor state switching module;

a first setting module for setting monitor mix balances in respective ones of the monitor states; and a second setting module for switching between a default value of a monitor mix balance and a value of an even balance.

7. A non-transitory computer readable storage medium including a program that is executed by a computer connected to at least one external apparatus, for inputting and mixing a plurality of audio signals and outputting a resulting mixed audio signal, comprising:

an internally mixing module for mixing the input plurality of audio signals and generating a mixed audio signal;

an input module for inputting an audio signal generated by the external apparatus;

a monitor output signal generating module for mixing the mixed audio signal generated in said internally mixing module and the audio signal input from the external apparatus by using a predetermined monitor mix balance to generate a monitor output signal;

a monitor state switching module for alternately switching between a first monitor state and a second monitor state; and a setting module for setting a first balance value as the monitor mix balance in the first monitor state, and setting a second balance value as the monitor mix balance in the second monitor state;

wherein the setting module further comprises a balance value setting module when the monitor state switching module switches to a continuously-depressed state, for displaying a screen for setting the first balance value and the second balance value and setting the first balance value and the second balance value on the screen as the monitor mix balance.

8. A mixing apparatus according to claim 1, wherein said mixing apparatus is further connected to at least one external recording apparatus, and wherein said mixing apparatus comprising:

a recording audio signal generating and outputting device that generates an audio signal for recording from the input plurality of audio signals and outputs the generated audio signal to the external recording apparatus;

and a monitor audio signal generating device that internally generates an audio signal for monitoring from the input plurality of audio signals, wherein said monitor output signal generating device mixes the internally generated monitor audio signal and the audio signal input from the external recording apparatus by using a predetermined monitor mix balance to generate a monitor output signal.

9. A mixing apparatus according to claim 2, wherein said mixing apparatus is further connected to at least one external recording apparatus, and wherein said mixing apparatus comprising:

a recording audio signal generating and outputting device that generates an audio signal for recording from the input plurality of audio signals and outputs the generated audio signal to the external recording apparatus; and a monitor audio signal generating device that internally generates an audio signal for monitoring from the input plurality of audio signals, wherein said monitor output signal generating device mixes the internally generated monitor audio signal and the audio signal input from the external recording apparatus by using a predetermined monitor mix balance to generate a monitor output signal.

* * * * *